United States Patent [19]
Runyon

[11] Patent Number: 5,739,031
[45] Date of Patent: Apr. 14, 1998

[54] SOIL AND WATER REMEDIATION AND ENHANCEMENT PROCESS AND APPARATUS THEREFOR

[75] Inventor: Larry Runyon, Pauma Valley, Calif.

[73] Assignee: Eco Soil Systems, Inc., San Diego, Calif.

[21] Appl. No.: 520,826

[22] Filed: Aug. 29, 1995

Related U.S. Application Data

[63] Continuation-in-part of Ser. No. 190,632, Feb. 2, 1994, Pat. No. 5,447,866.

[51] Int. Cl.⁶ ..................................................... C12M 3/00
[52] U.S. Cl. ...................... 435/262; 435/267; 435/243; 435/252; 435/283.1; 435/284.1; 435/307.1; 210/606; 210/610; 210/632
[58] Field of Search ................................ 435/243, 252, 435/260, 262, 262.5, 267, 283.1, 286.1, 307.1; 210/606, 610, 632, 143, 170

[56] References Cited

U.S. PATENT DOCUMENTS

| | | | |
|---|---|---|---|
| 5,227,067 | 7/1993 | Runyon | 210/606 |
| 5,227,068 | 7/1993 | Runyon | 210/610 |

FOREIGN PATENT DOCUMENTS

| | | | |
|---|---|---|---|
| 00228626 | 7/1987 | European Pat. Off. | A62D 3/00 |
| 01920328 | 11/1969 | Germany . | |
| 95160038 | 9/1994 | U.S.S.R. | C02F 3/34 |

*Primary Examiner*—David A. Redding
*Attorney, Agent, or Firm*—Brown, Martin, Haller & McClain, LLP

[57] ABSTRACT

A simplified method is disclosed for handling growth and dispersion of microorganisms in solution and which is adaptable to many different end-use applications, including treatment of turf, decorative and ornamental vegetation, horticultural plants and agricultural crops. Provision of the initial microorganism materials in the form of aqueous suspensions which are incorporated in liquid form into a large volume of water in a vessel and subsequent growth of biomass in the vessel provides for simplicity and flexibility not previously obtained from the prior art devices and methods. The method provides biomasses containing microorganisms to enhance vegetation growth, provide disease- and/or pest resistance, detoxification, solids removal, or any combination thereof. Apparatus to carry out the method of the invention is also disclosed, includes efficient and simply liquid feed devices.

29 Claims, 3 Drawing Sheets

SOIL AND WATER REMEDIATION AND ENHANCEMENT PROCESS AND APPARATUS THEREFOR

CROSS-REFERENCE TO RELATED APPLICATION

This application is a continuation-in-part of application Ser. No. 08/190,632, filed on Feb. 2, 1994, entitled "Reactor for Microorganisms and Feed Device Therefor", and which will issue as U.S. Pat. No. 5,447,866 on Sep. 5, 1995.

BACKGROUND OF THE INVENTION

1. Field of the Invention

The invention herein relates to processes for improving the conditions of soil and water and to improve their ability to support vegetation, including crops. More particularly, it relates to such methods which use microorganisms to enhance the soil and water properties.

2. Background of the invention

Improvement of soil and water conditions to enhance vegetation growth is a subject of significant interest and importance. Parks, golf courses, cemeteries, sod farms, athletic fields, and similar locations all need extensive decorative and functional vegetation, including grass, shrubbery and trees. The vegetation must be easy to maintain, provide pleasing visual appearance and be hardy, to sustain itself throughout extensive use, particularly for areas such as parks, athletic fields and golf courses. Commercial horticulture, such as greenhouses and production of landscape and bedding plants, also requires soil and water which are supportive of vigorous and healthy growth of the commercial plants. Similarly, agriculture also requires soil and water conditions which support optimum plant growth, whether of field crops, row crops or tree crops.

Many water supplies or water bodies are contaminated in one manner or another. It is typical for well water to include contaminants which were originally dissolved or entrained in ground water which subsequently flowed into the wells, carrying the contaminants with it. At the other end of the scale, waste water collection ponds, which of course are highly contaminated at the outset, must often be treated to reduce the contamination so that the water can be reused for various purposes and so that high degrees of residual contamination do not accumulate in a waste water pond over a period of time.

Several previous patents have issued which have dealt to some extent with these various issue. These patents (U.S. Pat. Nos. 5,227,067; 5,227,068; and 5,314,619, all in the name of L. Runyon, and assigned to Eco Soil Systems, Inc. of San Diego, Calif.) deal with a variety of aspects of soil remediation and enhancement and water treatment by applying various microorganisms, enzymes and nutrients for the microorganisms to soil and water. The systems described in those patents have proved to be quite successful, and substantial benefits have been obtained for such application areas as golf courses, parks and field crops. However, these previous systems utilized solid reactants which had to be dissolved or dispersed prior to use, or were cumbersome and not particularly suited for soil or water treatment over large areas or in a wide variety of different types of applications. In particular, the handling of the solid reactants often posed problems with respect to different dissolution rates, concentrations and growth rates.

SUMMARY OF THE INVENTION

The invention herein provides a convenient system which, while retaining all of the beneficial aspects of the previous systems, is substantially simplified with respect to handling growth and dispersion of microorganisms in solution and is also adaptable to many different end-use applications, including treatment of turf, ornamental vegetation, horticultural and agricultural crops. Provision of the initial microorganism materials in the form of aqueous suspensions which are incorporated into a large volume of water in a vessel and subsequent growth of biomass in the vessel provides for simplicity and flexibility not previously obtained from the prior art devices and methods.

Therefore, in one embodiment, the present invention is a method for remediation and enhancement of soil or water which comprises: forming concentrated aqueous suspensions of microorganisms and/or nutrients therefor; injecting the aqueous suspensions into a substantially larger volume of water in a vessel; retaining the larger volume of water with the suspensions dispersed therein in the vessel at a temperature and for a time sufficient for the microorganisms to feed on at least a portion of the nutrients, reproduce and multiply into a concentrated biomass containing a remainder of the nutrients and an increased number of the microorganisms in the water; thereafter dispensing the biomass, completely or continuously, from the vessel and dispersing the biomass to soil or water; and maintaining the microorganisms, at the soil or water, alive and active with the remainder of the nutrients for a period of time sufficient to enhance predetermined desirable properties of the soil or water or reduce predetermined undesirable properties of the soil or water. If the biomass is dispensed continuously, aqueous suspensions of nutrients will be continuously added to the vessel to maintain the biomass density.

In yet another embodiment, the invention is apparatus for remediation and enhancement of soil or water which comprises: at least one container for a concentrated aqueous suspension of microorganisms and/or nutrients therefor; a vessel larger than the container, and a liquid conduit therebetween; an injector for moving the aqueous suspension through the conduit and injecting the aqueous suspension into a volume of water greater than the volume of the aqueous suspension, and within the vessel; operating means for producing and maintaining conditions over a period of time within the vessel conducive to reproduction and growth of the microorganisms in the presence of the nutrients, such that the microorganisms, during the period of time, multiply into an aqueous biomass comprising the microorganisms dispersed in vessel water; and dispensing means for removing aqueous biomass from the vessel; such that the aqueous biomass can subsequently be dispersed into soil or water and the microorganisms therein maintained alive and active for a period of time sufficient to enhance predetermined desirable properties of the soil or water or reduce predetermined undesirable properties of the soil or water.

Microorganisms useful herein will enhance plant growth, provide pest suppression or eradication, soil or water detoxification, solids degradation or any combination thereof. Exemplary microorganisms include thermophiles, microorganisms which utilize hydrocarbons as growth substrates, nitrogen fixing bacteria, halophiles, oxygen-generating bacteria, specific disease control agents, broad spectrum disease control agents, microorganisms for thatch or rubble degradation, and microorganisms which function as insecticides, fungicides, metabolites and/or herbicides. The system also functions to encourage microbial growth to stimulate metabolite production, such as, of antibiotics that perform as fungistats, bactericides and the like.

Figure 1:
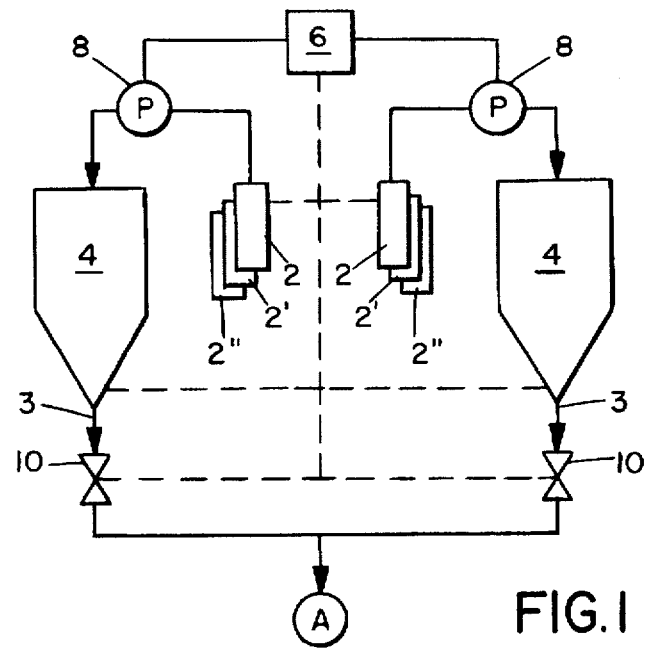
FIG. 1 is a schematic diagram of the basic process of the present invention, illustrating liquid feeders, biomass growth reactors and control systems for controlling the operation of the process.
Figure 2:
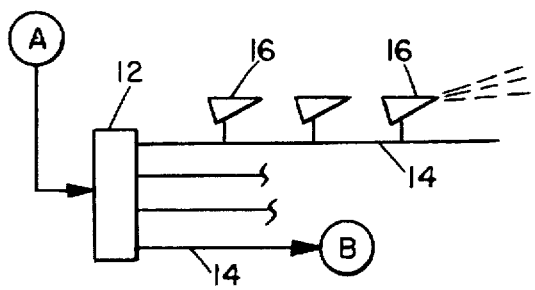
FIGS. 2, 3 and 4 are schematic diagrams of different systems for dispersing the biomasses grown in the present process, including dispersion by spray and irrigation, dispersion remotely by vehicles, and dispersion remotely by connected systems.

FIGS. 5, 6 and 7 illustrate pictorially different end-use applications of the present process, including the treatment of turf and ornamental plants (illustrated as a golf course in FIG. 5), use in horticulture (illustrated by treatment of greenhouse plants in FIG. 6), and use in agriculture (illustrated by treatment of row crops in FIG. 7).

FIGS. 8 and 9 illustrate schematically respectively, the treatment of well water by the process of this invention for purification of the water and charging the water with nutrients and treatment of waste water (FIG. 9), illustrating the use of the process for reduction of solids and toxins and purification for ultimate reuse of the cleaned up affluent.

FIG. 10 illustrates a multi-chambered biomass growth reactor which provides for isolated growth different microbes.

FIG. 11 illustrates a biomass growth reactor in which indiscriminate growth microorganisms, such as fungi, can be grown and then the resulting biomass is macerated to permit free flow of the microorganisms through the system.

FIG. 12, divided into sections A and B, illustrate two means of delivery of the compositions herein: by airplane (12-A) and manually operated distributor (12-B).

FIG. 13 illustrates schematically the use of the invention for the purpose of ground water remediation.

DETAILED DESCRIPTION AND PREFERRED EMBODIMENTS

The process of this invention will be best understood by reference to the drawings.

In FIG. 1, the basic process is shown. A critical aspect is initially providing concentrated liquid solutions of microorganisms, enzymes and nutrients through feed devices 2. The use of the liquid microorganism feed from the concentrated containers 2 substantially enhances the present process with respect to the prior art which utilized solid initial reactants which had to be incorporated directly into the biomass growth reactors. Use of liquid feed through separate concentrate feed tanks 2 allows the growth process for the biomass in the growth reactors 4 to proceed much more rapidly at the start and with much greater uniformity, since the liquid microorganism feeds are readily dispersed throughout the growth tanks 4, rather than being concentrated at or near a solid feed container immersed in the liquid in the growth tank. A rapid and effective dispersion of the liquid throughout the growth tank allows for optimum biomass growth throughout the tank; rather than having some areas, close to a solid feed container, having over-stimulated growth and other areas, at some distance from the solid container, being essentially starved for microorganisms.

The various microorganisms (which will be illustrated specifically below) may either be mixed in liquid form in the concentrate feed containers 2, or individual microorganisms or mixtures of microorganisms may be contained in a plurality of feed concentrate containers (designated 2, 2' and 2"). Use of a plurality of concentrate containers 2 may be advantageous where there are a wide variety of microorganisms which are intended to be used and where different microorganisms are to be injected into the system at different times, or in different concentrations. Similarly, it is useful where a much larger quantity of one or a few types of microorganisms are to be used as compared to others, since the ones that need to be replenished frequently can be isolated in their own container or containers 2 which can be readily and frequently restocked or replaced, while the microorganisms, enzymes and nutrients which are used at a much slower rate can be kept in their own original concentrate containers.

The system is controlled by controller 6 which is preferably a microprocessor of appropriate type. The controller 6 senses the concentration and other operating conditions of the containers 2 and reactors 4, as indicated by the dashed lines, and at the preprogrammed times will stop or start pumps 8 to inject the initial concentrated liquid microorganism slurries or concentrated liquid nutrients from the tanks into the reactors 4, or will open valves 10 either to drain the reactors 4 completely of the accumulated biomass after the growth cycle is completed or to continuously drain the reactors 4 during a continuous flow cycle. Commercial tanks, sensors, controllers, and pumps and valves are all readily available. Some are described in the patents cited previously and others are described widely in the literature and commercial sources, such as catalogs. Those skilled in the art will be well aware of the various types of equipment which are available and appropriate herein.

The system in FIG. 1 is shown as having two parallel sets of concentrate tanks 2 and reactor 4. In some cases the process can be operated with a single reactor 4 and appropriate associated concentrate tank or tanks 2. However, this has the disadvantage that when a cycle is completed, the entire system must be shut down so that new supplies of the concentrated microorganisms, enzymes and nutrients can be supplied either to concentrate tank 2 or new tanks 2 inserted. More importantly however, the reactor 4 must be shut down for cleaning and sterilization and sanitizing. While a single system is shut down of course, there is no biomass being provided to the end use application, whether that is agriculture, horticulture or other application. It is therefore preferred to have at least two parallel systems, as illustrated in FIG. 1, each operating at a different point in the cycle of vessel cleaning, sterilization and sanitation; water addition; injection of the liquid feed suspension; growth of the biomass; and draining of the vessel and dispensing of the biomass, so that when one of the units is either shut down for maintenance and recharging, awaiting the slow growth of certain types of microorganisms, or in the event of some sort of malfunction, the other system can be operating to be producing the biomass and dispersing it to the end use application. In this regard it is contemplated that larger commercial systems utilizing the present invention may contain three or more parallel reactor/liquid feed concentrate units so that one or more may be operating at any given time, even while others are shut down for maintenance or are in a portion of the biomass growth cycle where it is not appropriate to disperse any of the biomass slurry. Those skilled in the art will be able to determine the optimum number of units for any given end use, depending on factors such as the area of soil or volume of water to be treated, the type and concentration of vegetation involved, and the cost of equipment.

Alternatively to operating two, three or more reactor/liquid feed concentrate units in parallel, a single unit may be run in a continuous flow cycle. The process of inoculating the reactor 4 from the liquid feed tanks 2 is as described above; however, once the biomass in reactor 4 has reached a sustainable density, it is drained through valve 10 at a constant rate which is consonant with maintenance of the biomass through continuous feeding from tanks 2. Thus, the soil or water being treated (or manifold(s), etc. being filled) may be continuously provided with a flow of biomass while the biomass within the reactor 4 is provided with sufficient nourishment to continue growing, thereby replenishing what is used. One advantage to this continuous process of feeding and dispersing the biomass is that the reactor 4 need not be cleaned and sterilized after each growth cycle. Those of skill in the art will be able to determine the rates of removal of the biomass and addition of nutrients to the reactor to maintain the continuous fermentation of the biomass.
Figure 3:
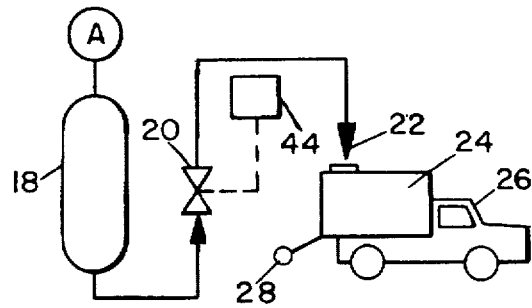
Figure 4:
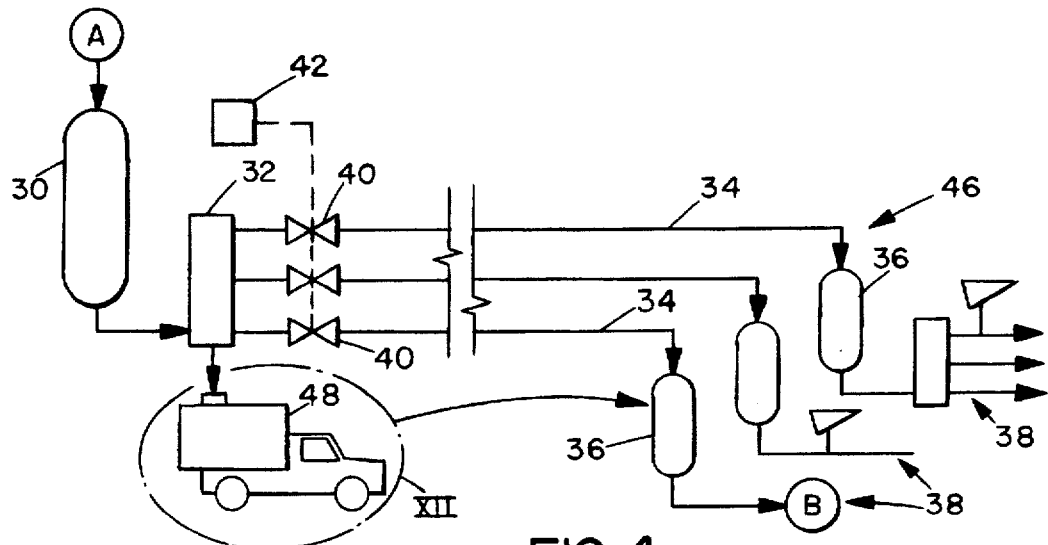
Figure 5:
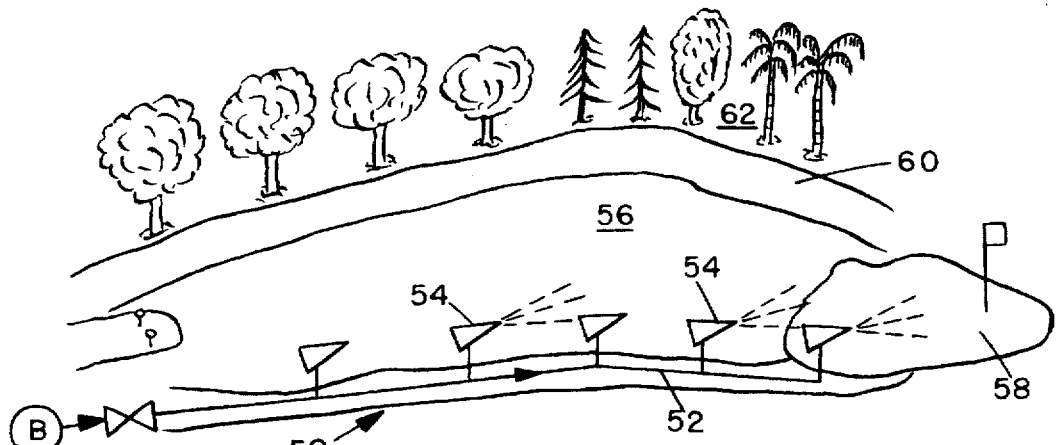
Figure 6:
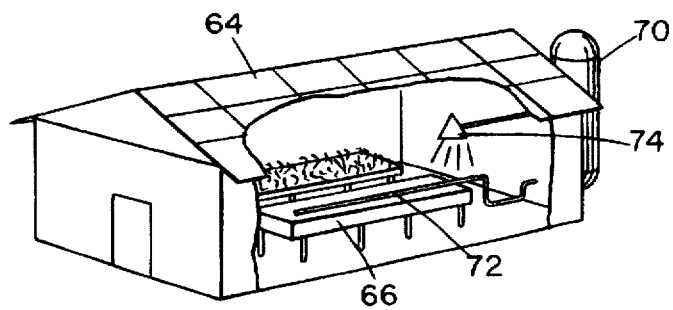
Figure 7:
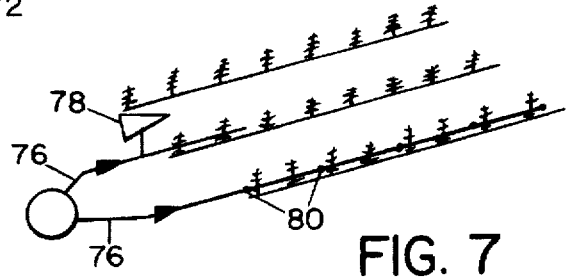
Figure 8:
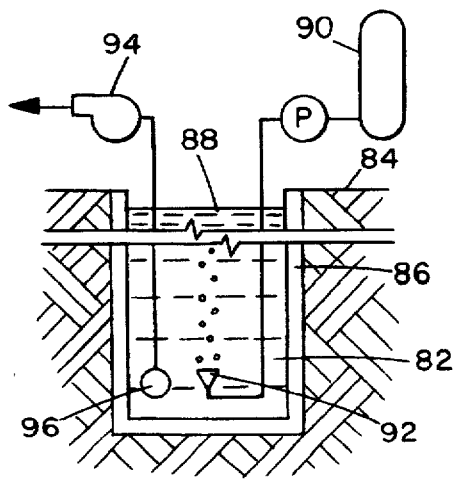

The tanks 2 and reactors 4 may be of any convenient size. It has been found particularly effective to have them sized such that an entire system containing a controller 6, one or more concentrate tanks 2 and the reactor 4 can be contained on a single pallet which can be moved by a forklift vehicle or contained on a trailer which is integral to or can be towed by a truck or similar vehicle from location to location. Such a trailer may be open or closed. A closed trailer of course, allows a system to operate while being sheltered from weather, dust and dirt. The connection A to the various end use applications would be mounted on the outside of the cover of the closed trailer so that connection by hose coupling or other conventional means could be easily obtained. Similarly, on skid or pallet mounted units, the coupling A will also be mounted on the pallet or skid, again for ease in coupling to other end use application systems. Of course, in many cases the units of the present invention will be permanently mounted at a central location, such as for a golf course or a park or athletic field, and a large plurality of individual systems can be placed together or a fewer number of systems with larger reactors and related equipment can be used.

FIG. 10 illustrates an alternative configuration of a biomass reactor 4'. This reactor includes a plurality of chambers illustrated as 2A, 2B, 2C and 2D, each of which can be used for isolated growth of individual microorganism biomasses or for storage of concentrated nutrient suspensions. At an intermediate stage or upon completion of growth one or more of these biomasses or nutrient solutions can then be dispensed into the mass of water slurry in common chamber 17, in which further mixing or growth can take place, prior to draining of the reactor 4' into the system through pipe 3.

Yet another embodiment of the reactor 4 is shown in FIG. 11, for use when the biomass is or includes a microorganism with indeterminate growth, such as a fungus. The resulting biomass 13 in chamber 17 is tangled and not easily flowable. Therefore the reactor 4 is modified by addition of a maceration section 9 in which there is a macerator 7 (essentially a chopping blade mechanism), driven by motor 11, which is used to chop the biomass into finely divided pieces 15 which can be suspended in the water and flow easily through the outlet pipe 3 and on through the system. The ability to use fungi, and particularly fungal spores, in the system enables delivery of viable, active and infective microorganisms to the target site.

Typical and important end means of dispersing the biomass grown in the reactors 4 are illustrated in FIGS. 2–4. In each case, the interconnection with the connector A is illustrated. In FIG. 2 the biomass is discharged through valve 10 from reactor vessel 4 and is passed to a manifold 12 from which it can be routed to a number of different individual piping systems 14, which in FIG. 2 are illustrated as spray irrigation lines with a plurality of spray heads 16 mounted at appropriate locations. It will be evident of course, that the line 14 can be any of a wide variety of types of irrigation devices, such as drip irrigation, spray irrigation, center pivot irrigation, or any mixture of types of systems. The manifold 12 can be either a simple manifold in which all of the lines 14 are supplied with liquid simultaneously, but more preferably will be either a manually or automatically controlled manifold in which the biomass slurry liquid is routed individually and separately to the different lines 14, depending on the particular irrigation needs of the soils and vegetation served by each of the lines 14. The sequencing can be automatic according to a predetermined program, can be manually operated or can be controlled in response to field conditions determined by sensors placed approximate to the various lines 14, so that the system responds as needed to the different soil and vegetation areas served by each of the lines on an as needed basis. For instance, if the system of FIG. 2 were in use in a large park with varied terrain, those areas of grass which are open and subject to direct sunlight, or that vegetation which is growing in well drained soils, would most commonly receive the slurry liquid more frequently than other areas of the park which are shaded or where the vegetation is growing in highly water retentive soils.

If desired, the system of FIG. 2 could be operated without a manifold 12 at all, so that the basic system of FIG. 1 feeds directly into a line 14. This type of operation is likely to be used only in very limited circumstances, since it does not permit a variation for different application needs, such as different soil conditions in the area being irrigated.

FIG. 3 illustrates another type of distribution system which is particularly useful for large open areas such as athletic fields, large parks or row or tree crops. In this case, the biomass slurry from tank 4 is passed to an accumulation or holding supply tank 18 from which it can be dispersed as needed through valve 20 to nozzle 22 from which it is flowed into tank 24 mounted on truck 26. Truck 26 is equipped with a spray system 28 from which the biomass liquid in tank 24 can be pumped and applied to the ground or to neighboring vegetation, including trees. Truck 26 can be driven to remote locations and there used to apply the biomass slurry to such things as row crops, orchard fruit trees or soil, or large open park or golf course areas for which pipeline irrigation systems such as that shown in FIG. 2 are not practical. The system of FIG. 3 is particularly useful where there are a large number of scattered plots to be treated with the biomass liquid and where a single tank truck 26 could move readily from plot to plot and carry enough biomass slurry liquid to irrigate and treat all of the plots on its route.

Yet another system is shown in FIG. 4, which consists of a holding tank or supply tank 30 from which the liquid can be passed to a manifold 32 and from there into conduits 34, each of which leads to a satellite supply tank 36, each of which in turn provides slurry liquid through various types of irrigation treatment systems 38. Passage of the slurry from manifold 32 to individual conduits 34 is controlled by valves 40 which in turn are controlled by a controller 42. Controller 42, and also controller 44, which controls valve 20 in the system of FIG. 3, can be a separate unit or can be part of the control system 6 of FIG. 1. Similarly, if it is desired to pump the liquid slurry directly from tanks 4 into the systems of FIG. 3 or FIG. 4, tanks 18 and 30 (FIGS. 3 and 4, respectively) can be eliminated from the system. The presence of tanks 18 and 30 is preferred however, in that they allow for accumulation of the liquid slurry so that it can be dispersed as needed and so that the reactors 4 can be used for other purposes without disrupting the operations of the systems of FIGS. 3 and 4 for local operation.

Alternatively, in FIG. 4, if the distances involved between the central system and the satellites 46 are excessive one or more of the conduits 34 of the system can be eliminated. In this case, the slurry can be loaded into a tank truck 48 and the truck driven to the satellite location where the slurry is transferred from the truck's tank to the tank 36.

Figure 12:
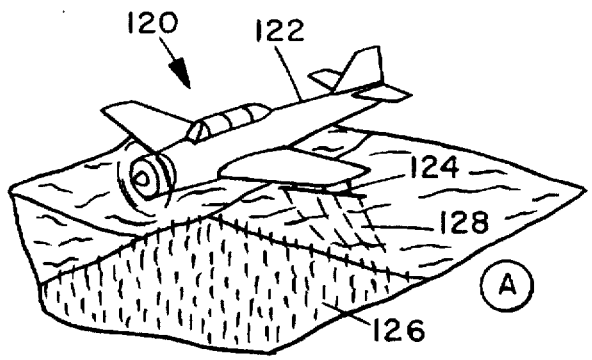
Figure 12:
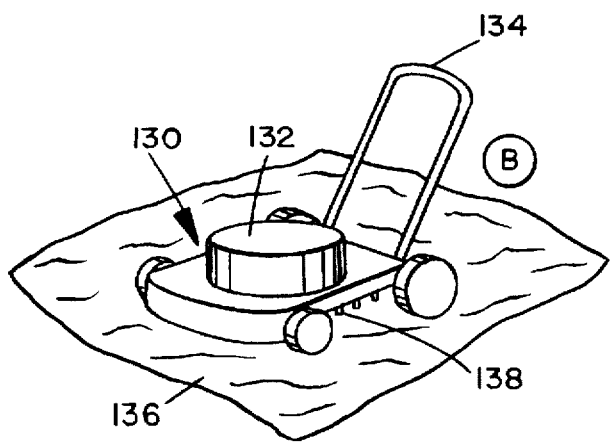

Yet other means of dispersion are illustrated in FIG. 12. Part A of FIG. 12 shows dispersion from an aircraft 120. Tanks within the aircraft's body 122 are connected by pipes to spray heads 124 on the outside of the aircraft, from which the slurry is dispensed as spray 128 onto the desired turf, crops or other plants 126. Use of aircraft is of course particularly suited for application of the present compositions to large or remote areas. Similarly, in Part B of FIG. 12, a small hand- or power-propelled device 130 similar in size to a lawn mower has a tank 132 mounted on it, with dispensers or spray heads 138 mounted underneath and connected to the tank 132 by suitable valved conduits. Handle 134, which may also contain the valve controls, is used to push or guide the device 130. This type of device is particularly suited to application of the compositions to small or delicate areas, illustrated here as a golf green 136.

Various end uses of the present invention are shown in FIGS. 5–9. FIGS. 5–7 illustrate use for soil treating, vegetation growth and turf enhancement, while FIGS. 8 and 9 illustrate various forms of water treatment. In FIG. 5, the irrigation system 50 is shown as connected to one or another of the systems in FIGS. 2 or 4, as illustrated at B. The liquid slurry is pumped through one or more conduits 52 to which are mounted various irrigation devices such as spray head 54 and from which the slurry is sprayed out over the various areas of turf or vegetation to be treated. In the situation illustrated in FIG. 5, the area is a golf course and the turf areas being irrigated by the sprays from nozzles 54 are fairways 56 and greens 58. Of course as desired, and depending on the type of terrain and local climate, the various irrigation systems 52 can also be used to irrigate areas of rough 60 or other areas 62 of the course. It will be understood that there will be a plurality of conduits 52 and that they will be controlled by various manifolds and, if needed, pumps (not shown), all in the conventional manner for irrigation of golf courses, parks and similar areas. Similar results will be obtained by treatment of other vegetation areas such as parks, athletic fields, road and railroad rights-of-way borders, greenbelts, lawns and the like.

FIG. 6 illustrates the use of the present system for horticulture as illustrated by greenhouse 64, shown partially cut away. Within the greenhouse are a variety of plant growing boxes or troughs 66, each of which is filled with soil and is used to grow the individual plants 68. This system of this invention can be enclosed in the housing 70 so that the greenhouse is operated directly with a single individual system. Alternatively, an individual system can be mounted in the housing 70 and used to supply not only greenhouse 64, but also neighboring greenhouses (not shown), since it is common in many commercial horticulture operations to have a number of greenhouses closely situated together, either for growing large numbers of the same types of plants or for growing a variety of different plants in the different greenhouses. Also alternatively, the housing 70 can encompass one of the satellite units 36 as illustrated in FIG. 4.

Regardless of whether it is a primary or a satellite system which is in the housing 70, the biomass slurry is piped into the greenhouse and distributed to the plants in one or more of different conventional routes, including direct feed to the plant trough 66 as illustrated at 72, which may be a simple liquid feed system or a drip irrigation system, or overhead spray of the plants as illustrated at 74. Other routes for applying the slurries to the plants, such as handheld hoses and nozzles connected to the slurry system, may also be used. Those familiar with greenhouse horticulture will be aware of the numerous methods of applying the slurry to the plants or the bedding soil in the troughs 66, and all of these are equally suitable for use in the present invention.

Yet another end use application is illustrated in FIG. 7, large area production agriculture. Again the particular irrigation systems 76 are shown as being connected to the system at B, and the variety of different irrigation units which can be used are illustrated by a spray nozzle 78 and drip irrigation nozzles 80. FIG. 7 illustrates row crops such as corn, or beans, but it will also be readily understood that the present invention is also applicable to field crops such as wheat and orchard or tree crops such as fruit trees and various types of nuts. This system is also applicable to both linear irrigation systems and also center pivot and cross field movable irrigation systems.

Numerous desirable properties of soil can be enhanced by treating with the present process and the microorganisms from the original liquid feed, which are multiplied and dispersed over soil and vegetation areas. Nitrogen fixation in the soil is improved and increased, thus leading to enhanced crop or other vegetation growth. Nutrient availability in the soil for vegetation growth is improved, as is the ability of plant roots to access such nutrients. Dispersion of growth factors, regulators and metabolites into the soil may be accomplished, which in turn will enhance growth of vegetation which utilize such materials. Conversely, undesirable properties of the soil, which inhibit vegetation growth, can be reduced or eliminated. Treatment of the soil with microorganism-specific antibiotics can eliminate harmful pathogens which are initially present in the soil without adverse effect on desirable microorganisms supplied to the soil through the present process. Similarly, various harmful organic or inorganic compounds, such as salts, hydrocarbons and pesticide residues, may be eliminated or their effects reduced by action of specific microorganisms supplied herein. Thus, soil which has previously been capable of only low yield of crops, poor support of vegetation, or even devoid of sustainable vegetation can be remediated by treatment by the present process, to the point where lush, healthy vegetation and abundant crops can be grown, and then subsequently maintained by continued application of the present process. It will of course be understood that the quantities and types of microorganisms, nutrients, enzymes, metabolites and other materials supplied by the present process will vary depending on the types of soil and vegetation involved, whether the process is being used for remediation or maintenance of soil and vegetation, the local topography, whether edible crops are being grown, and the like. Those skilled in the art will have no difficulty determining the optimum types of microorganisms and other materials to provide through the initial liquid feed, the amount of biomass to produce, and the application of the biomass to the designated soil or vegetation.

FIGS. 8 and 9 illustrate various types of water treatment which can be accomplished by the present invention. In FIG. 8 the system of the present invention is used to purify contaminated well water. A well 82 formed in the ground 84 and framed by a porous lining 86 is shown filled with water 88. The biomass slurry of the present invention is contained in tank 90 from which it is pumped to a sparger or other dispersing device 92 submerged in the well, preferably near the bottom. As the biomass disperses into the water and remains there for an appropriate period of time, the biomass and the microorganisms and enzymes gradually eliminate the various contaminants in the water, so that after a period of time (usually a matter of days or weeks) the well water is substantially decontaminated and can be used by being pumped out by pump 94 drawing water through inlet 96. If the contamination is entering the well as ground water in the soil 84 through the porous lining 86, the rate of withdrawal of the water, once the well water 88 is initially purified, should be maintained at a rate at or below the rate at which the biomass slurry being pumped in from tank 90 can decontaminate the incoming water.

Figure 9:
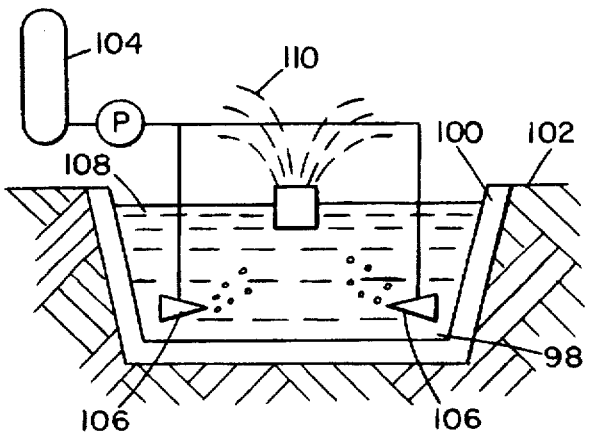
Figure 10:
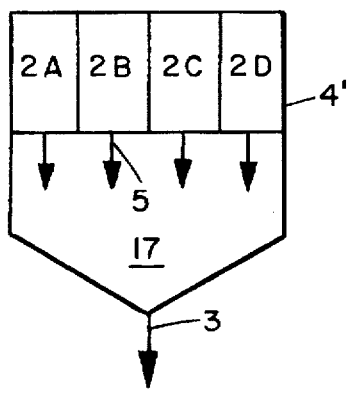
Figure 11:
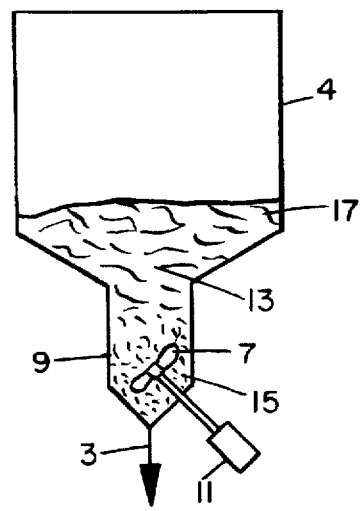

In FIG. 9, a waste water effluent pond 98 is formed with an impervious liner 100 sunk into soil 102. The biomass slurry is contained in tank 104 from which it is pumped to spargers or similar dispersing devices 106 which are submerged in the effluent body 108. The biomass is pumped into the water and replenished as needed over a period of time necessary to reduce the contamination and the effluent to the desired level. The biomass will effect a reduction of the solid content of the effluent, especially the organic solids, and will also serve to detoxify toxic contaminants in the effluent. It is contemplated that a single treating pond 98 may not be sufficient in many cases and the treated effluents will have to be transferred sequentially to additional ponds for further treating in order to obtain the overall degree of contaminants, solid and toxin reduction and elimination that is desired. Also, the treatment by the biomass of the present invention preferably will be conducted in conjunction with conventional effluent treating processes such as aeration 110 and filtration.

Figure 13:
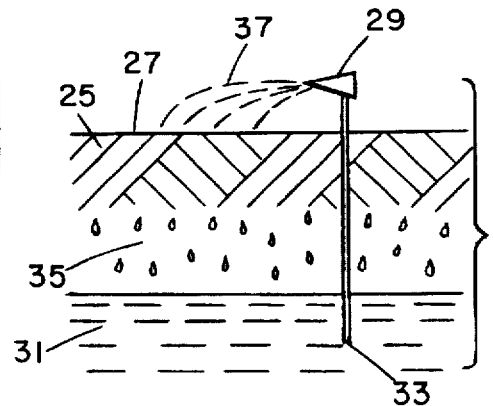

As with soil and vegetation enhancement or remediation, water treatment by the process herein produces substantial improvements in water quality. Injection of the biomass materials herein into a body of water, such as well water or water retained in a container such as a tank, can improve the water quality by elimination or reduction of organic materials and salts and by detoxification of toxins. The same will be true, on a greater scale, for treatment of heavily contaminated water supplies, such as wastewater effluents or contaminated ground water aquifers. The ground waters also benefit indirectly from the treatment of soils described above, since the presence of an active microbial region in the upper layers of soil will denitrify nitrates and immobilize ammoniacal nitrogen, thus preventing conversion to nitrates at a rate greater than such nitrates can be utilized by the local growing vegetation. Direct treatment of ground water is illustrated in FIG. 13, in which an "active" layer 25 of soil is created in which the microorganisms, enzymes and nutrients of this invention are contained. Layer 25 is at the top of the soil profile, is commonly a few feet deep and usually includes ground surface 27. A pipe with a spray head 29 and suitable pumping means (not shown) reaches down to aquifer 31 and draws contaminated ground water from the aquifer 31 into the pipe through inlet 33. The water is sprayed out 37 onto the ground surface 27, from which it soaks back into the ground. It passes through active layer 25 where it is at least partially decontaminated. The decontaminated water continues to flow through deeper strata or soil layers 35 until it returns to the aquifer 31. Continued pumping, spraying and passage of the water through the active layer will eventually produce a substantial reduction in the contaminant level in the aquifer water.

Other applications of this process of water and/or soil treatment are also contemplated, though not specifically identified. For example, it is understood that septic tanks are particularly susceptible to decontamination by this process. The contaminated water of the septic tank may be removed, treated by the disclosed process and returned to the tank or the biomass may be delivered directly to the septic tank or some similar treatment may be implemented. Similarly, the soil to be treated by the disclosed process may be located essentially anywhere and used to grow virtually anything. For instance, it will be recognized that this process may be used to enhance soil which is used to graze animals or to enhance residential yards or gardens, as well as commercially used soils.

The microorganisms preferably useful in this invention grow by means of a consistent supply of nutrients and availability of adequate oxygen. It is not preferred to use microorganisms which rely on photosynthesis and are therefore dependent upon the presence of light for growth. However, if it is desired to use such microorganisms, the vessel 4 can incorporate its own lighting system to provide light for the biomass growth either by having vessel 4 be made of a clear or translucent material which allows ambient light into the biomass within or by having artificial light positioned such that the artificial light is focused into the biomass.

The growth of the microorganisms may also be aided by mechanical mixing of the aqueous biomass in the vessel, as by use of a mechanical mixer or by recycle of the aqueous biomass through an external recycle conduit (not shown). Both recycle and mixer usage are common in biomass vessels and those skilled in the art will be well aware of the techniques and equipment available and how such should be used. The degree of turbulence induced by either the mixer or the recycle must be kept within relatively low limits, to avoid shear degradation of the microorganism biomass, particularly as the microorganism biomass becomes concentrated toward the end of each growth cycle.

Typical of the various materials which can comprise the biomass are different microorganisms, either singly or in various mixtures in the aqueous suspensions, together with appropriate nutrients and enzymes. Many such microorganisms, nutrients and enzymes are commercially sold as proprietary products. Those skilled in the art are able to determine the materials appropriate for their needs by selecting those which provide the desired seed treating functions, such a growth enhancement, disease-resistance and/or pest-resistance. For example, *Azospirillum brasilense* is useful for non-symbiotic nitrogen fixation on grasses and for seedling establishment enhancement. Rhizobium ssp. are useful for symbiotic nitrogen fixation in legumes. The Bacillus species *licheniformis, subtilis* and *polymyxa*, on the other hand, are useful for general soil improvement such as aggregate formation and stabilization. Additionally, most species of the Bacillus genus are useful as hyper-cellulase producing organisms for thatch and/or rubble degradation. Gliocladium spp. provide control from diseases, such as root rot and the fungal disease, phytophthora, and Trichoderma spp. are useful both as a broad spectrum disease control microorganism and as a hypercellulase producing organism.

Examples of other useful microorganisms include thermophiles such as Archaebacteria, described in Brock et al., *Biology of Microorganisms* (5th edn., 1988) §18.6; microorganisms which utilize hydrocarbons as nutrients, such as *Pseudomonas and Mycobacterium* (Brock et al., §16.23); nitrogen fixating bacteria such as Azotobacter spp., Cyanobacteria and *Bacillus polymyxa* (Brock et al., §16.24); and halophiles such as Halobacterium (Brock et al., §19.33). Additional typical microorganisms are oxygen-generating bacteria exemplified by a microorganism product commercially available under the trade name "AG-14" from Natural Oxygen Products of El Paso, Tex., and described in U.S. Pat.

No. 3,855,121. Similar microorganisms include Pseudomonas, Flavobacterium, Euglina spp. and the three Bacillus species previously discussed. See, e.g., Brock et al., §§19.15, 19.20, and 19.26 and Moore et al., *Biological Science* (1963), pp. 248-249.

Numerous microbial nutrients and enzymes are also known, such as those exemplified by a product commercially available under the trade name "BNB-931" from Westbridge Company of Carlsbad, Calif., and a chelated product commercially available under the trade name "Sun-Up". The chelating agent in "Sun-Up" is citric acid. Microorganisms which function as insecticides, fungicides, metabolites and/or herbicides may also be part of the biomass. A particularly preferred product useful in this regard is a fungicidal/nematocidal product in which the active ingredient is *Burkholderia cepacia*, type Wisconsin, in a concentration of $10^5$ cells/gram. This product is commercially available under the trade name "Deny" from CCT Corporation of California. Another useful product is "Azo-Kote" from Encore Technologies, Inc. of Minnesota, which has *Azospirillium brasilense* as its active ingredient and is useful for non-symbiotic nitrogen fixation.

The above are only examples of the various materials that may comprise the biomass and are in no way intended to limit the scope of the invention. It is intended to include, as part of the concept of this invention, both currently known and commercially available microorganisms, enzymes and nutrients and those of similar function which become available and approved for seed treating applications in the future.

It will be evident that there are numerous embodiments of this invention which, while not expressly described above, are clearly within the scope and spirit of the invention. The above description is therefore intended to be exemplary only, and the scope of the invention is to be limited solely by the appended claims.

I claim:

1. A method for remediation or enhancement of soil or water which comprises:
   forming a concentrated aqueous suspension of microorganisms and nutrients therefor in a single first vessel;
   injecting said aqueous suspension as a batch into a substantially larger volume of water in a second vessel;
   retaining said larger volume of water with said suspension dispersed therein in said second vessel at a temperature and for a time sufficient for said microorganisms to feed on at least a portion of said nutrients, reproduce and multiply into a concentrated biomass containing a remainder of said nutrients and an increased number of said microorganisms in said water;
   thereafter dispensing said biomass from said second vessel and dispersing said biomass to soil or water; and
   maintaining said microorganisms alive and active with said remainder of said nutrients for a period of time sufficient to enhance predetermined desirable properties of said soil or water or reduce predetermined undesirable properties of said soil or water.

2. A method as in claim 1 where said aqueous suspension further comprises enzymes, vegetation growth factors, vegetation growth regulators, antibiotics or metabolites.

3. A method as in claim 1 comprising a plurality of said concentrated aqueous suspensions, each disposed in a different first vessel.

4. A method as in claim 3 wherein a first individual suspension in said plurality comprises components different from components in a second individual suspension in said plurality.

5. A method as in claim 4 wherein said first and second suspensions in respective first vessels are injected into said large volume of water in said second vessel at different times during a biomass growth cycle.

6. A method as in claim 1 comprising a plurality of sets of said first and second vessels, each of which sets contains a biomass in a stage of growth different from biomasses in other vessels or which is empty of biomass and water and is undergoing preparation for water addition, subsequent aqueous suspension injection into said water, and resulting biomass growth.

7. A method as in claim 6 wherein a sequence of steps of vessel preparation, addition of water, biomass growth and biomass dispensing exists for each set of vessels in said plurality.

8. A method as in claim 7 wherein at least one set of vessels in said plurality of sets is at any time at a different point in its said sequence than at least another set of vessels in said plurality is in its said sequence.

9. A method as in claim 1 wherein said microorganisms include species having indeterminate growth.

10. A method as in claim 9 further comprising macerating a biomass comprised of said species to comminute said biomass into portions adapted to flow in a liquid slurry.

11. A method as in claim 1 wherein said biomass is dispersed onto soil.

12. A method as in claim 11 wherein said soil supports turf, field crops, ornamental plants, row crops or tree crops.

13. A method as in claim 11 wherein said biomass is dispersed onto said soil in the form of an aqueous slurry of said biomass.

14. A method as in claim 13 wherein dispersion of said biomass onto said soil comprises transferring said biomass from said second vessel into a third vessel, and thereafter dispersing said biomass onto said soil from said third vessel.

15. A method as in claim 14 wherein said third vessel is part of a mobile vehicle and said mobile vehicle transports said biomass from said second vessel to said soil.

16. A method as in claim 15 wherein said vehicle comprises an aircraft, truck, trailer or hand-propelled or guided mobile device and said dispersing comprises dispersing said biomass onto said soil from said vehicle.

17. A method as in claim 13 wherein dispersion of said biomass onto said soil comprises transposing said aqueous slurry of said biomass though a liquid conduit from said second vessel to a spray nozzle thereafter dispersing said biomass onto said soil from said spray nozzle.

18. Apparatus for remediation or enhancement of soil or water which comprises:
   a single first vessel for a concentrated aqueous suspension of microorganisms and nutrients therefor;
   a second vessel larger than said first vessel, and a liquid conduit therebetween;
   an injector for moving said aqueous suspension as a batch through said conduit and injecting said aqueous suspension into a volume of water greater than the volume of said aqueous suspension, and within said second vessel;
   operating means for producing and maintaining conditions over a period of time within said second vessel conducive to reproduction and growth of said microorganisms in the presence of said nutrients, such that said microorganisms during said period of time multiply into an aqueous biomass comprising said microorganisms dispersed in the vessel water; and
   dispensing means for removing aqueous biomass from said second vessel;

such that said aqueous biomass can subsequently be dispersed into soil or water and said microorganisms therein maintained alive and active for a period of time sufficient to enhance predetermined desirable properties of said soil or water or reduce predetermined undesirable properties of said soil or water.

19. Apparatus as in claim 18 comprising a plurality of said first vessels, each with an individual injector and conduit to said second vessel, and each first vessel being capable of containing a concentrated aqueous suspension of microorganisms and nutrients therefor different from the concentrated aqueous suspension of microorganisms and nutrients therefor contained in at least one of the others of said first vessels in said plurality.

20. Apparatus as in claim 19 further comprising a controller to regulate rate and timing of injection of each said aqueous suspension from each respective said first vessel into said second vessel.

21. Apparatus as in claim 18 a plurality of sets of said first and second vessels, each adapted to permit growth of a microorganism biomass in isolation from microorganism biomasses in the other sets of vessels of said plurality.

22. Apparatus as in claim 21 wherein said set of vessels in said plurality of sets is housed within a single housing.

23. Apparatus as in claim 18 further comprising liquid conveyance means to transport said dispensed aqueous biomass from said second vessel to said soil or water.

24. Apparatus as in claim 23 wherein said conveyance means comprises a liquid conduit and spray nozzle to spray said aqueous biomass onto said soil or water.

25. Apparatus as in claim 23 wherein said conveyance means comprises a vehicle having a tank into which said aqueous biomass in loaded for transport to said soil or water.

26. Apparatus as in claim 25 wherein said aqueous biomass is dispersed directly from said tank to said soil or water.

27. Apparatus as in claim 25 wherein said vehicle comprises an aircraft, truck, trailer or hand-propelled or guided mobile device.

28. Apparatus for remediation or enhancement of soil or water which comprises:

a container for a concentrated aqueous suspension of microorganisms and/or nutrients therefor;

a vessel larger than said container, and a liquid conduit therebetween;

an injector for moving said aqueous suspension through said conduit and injecting said aqueous suspension into a volume of water greater than the volume of said aqueous suspension, and within said vessel;

operating means for producing and maintaining conditions over a period of time within said vessel conducive to reproduction and growth of said microorganisms, such that said microorganisms multiply into an aqueous biomass comprising said microorganisms in excess nutrients and dispersed in the vessel water; and dispensing means for removing the aqueous biomass from said vessel, such that said aqueous biomass can subsequently be dispersed into soil or water and said microorganisms therein maintained alive and active for a period of time sufficient to enhance predetermined desirable properties of said soil or water or reduce predetermined undesirable properties of said soil or water.

29. Apparatus as in claim 28 wherein said dispensing means continuously dispenses said aqueous biomass and said operating means continuously provides nutrients to said vessel, such that the density of said aqueous biomass remains about constant.

* * * * *

UNITED STATES PATENT AND TRADEMARK OFFICE
CERTIFICATE OF CORRECTION

PATENT NO. : 5,739,031
DATED : April 14, 1998
INVENTOR(S) : RUNYON, Larry

It is certified that error appears in the above-identified patent and that said Letters Patent is hereby corrected as shown below:

COLUMN 12, CLAIM 17, LINE 44: replace "transposing" with --transporting--

Signed and Sealed this

Twenty-second Day of December, 1998

Attest:

BRUCE LEHMAN

Attesting Officer

Commissioner of Patents and Trademarks